Jan. 7, 1964 — T. E. BAXTER — 3,116,731
CAST VENTILATING ARRANGEMENT

Filed April 30, 1962 — 2 Sheets-Sheet 1

INVENTOR.
THOMAS E. BAXTER
BY
Cushman, Darby & Cushman
ATTORNEYS

Jan. 7, 1964  T. E. BAXTER  3,116,731
CAST VENTILATING ARRANGEMENT
Filed April 30, 1962  2 Sheets-Sheet 2
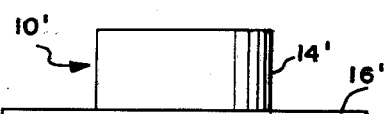
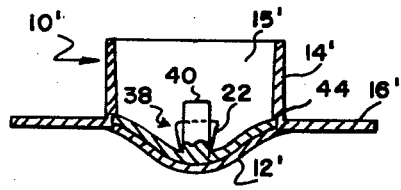
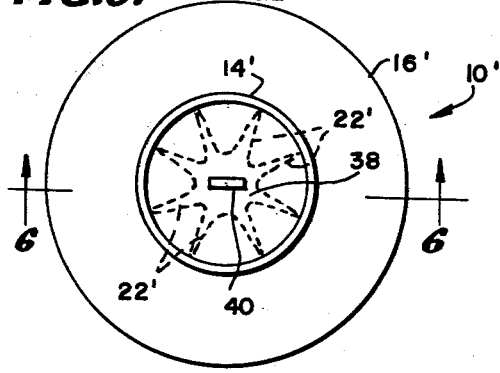
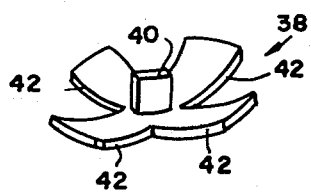
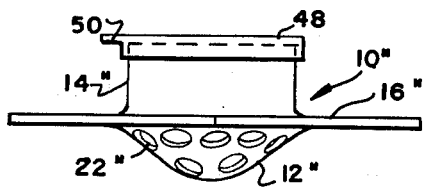
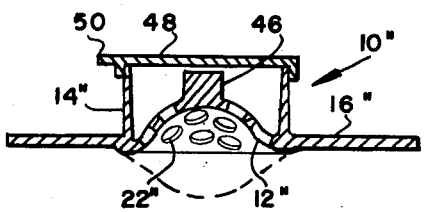
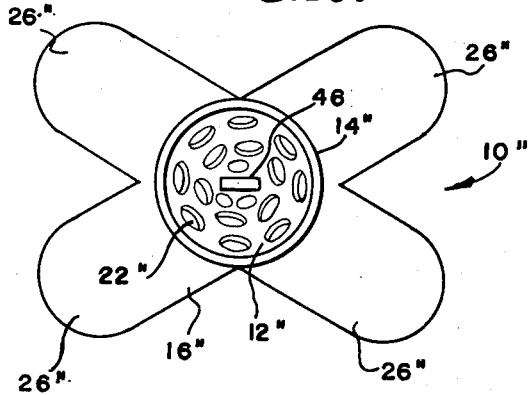
INVENTOR.
THOMAS E. BAXTER
BY
Cushman, Darby & Cushman
ATTORNEYS United States Patent Office 3,116,731
Patented Jan. 7, 1964

3,116,731
CAST VENTILATING ARRANGEMENT
Thomas E. Baxter, 301 Commerce Bldg., Allentown, Pa.
Filed Apr. 30, 1962, Ser. No. 190,982
10 Claims. (Cl. 128—91)

This invention relates to the ventilation of surgical casts and in particular to an improved vent for permitting air to be circulated between the cast and the skin over which the cast has been placed.

As is known, the ventilation of casts is desirable in order to reduce irritation of the skin, caused by the presence of moisture over prolonged periods. The skin irritation may be merely a hot itching sensation experienced by the patient or in aggravated cases may lead to infection.

Casts are conventionally applied to injured parts of the body by wrapping bandages impregnated with plaster of Paris and dipped in water around the injured parts after broken bones have been set, or after other preliminary medical treatment has been given. Usually a soft porous layer of material such as cotton sheet or stocking is placed next to the skin to absorb moisture and protect the skin from abrasion, and then cotton batting or other soft material is wrapped over the stocking. Finally the impregnated, wet bandage is wrapped around the part and allowed to harden.

It has been suggested that rigid nipple-like devices be incorporated into the cast during its application for ventilation purposes, the outer ends of the nipples being open to the atmosphere and the inner ends being open and in close proximity to the skin under the cast. Typically, the nipples may be incorporated by placing one end in contact with the stocking or batting and then wrapping the impregnated bandage so as to hold them in place. In general, these prior ventilating devices depend on natural air circulation and circulation caused by slight movements of the body part within the cast, and therefore must be rather numerous if effective ventilation is to be achieved. It has also been suggested that a bulb or syringe can be used in conjunction with the nipples to introduce air or medicants. In all known arrangements, however, the bore of the nipples is quite small so that a relatively large number of nipples must be incorporated into the cast thereby adding to the complexity of wrapping the impregnated bandage. The proper application of a cast requires considerable skill, and it is apparent that the additional manipulative steps of placing a large number of nipples and wrapping the bandage into engagement therewith add to the difficulty of the operation.

In accordance with the present invention, a vent member having a relatively large bore is provided which is adapted at its upper end to be coupled to a vacuum cleaner hose or the like so that effective ventilation of the cast can be achieved with a small number of such members. The task of applying a cast is thereby simplified without sacrificing the desirable feature of a ventilating means. Further, the lower portion of the vent is so designed as to permit free passage of air therethrough and at the same time prevent the cotton batting or the like from entering the bore. The invention also contemplates a vent means having an effective bore diameter which is adjustable so that parts of the cast which may otherwise be difficult to ventilate may be ventilated by a combination of partially or completely closing some of the vents and selecting an appropriate vent for attachment to a vacuum cleaner hose or the like.

Other advantages of the present invention will become apparent from a reading of the following detailed description taken in conjunction with the drawings in which:

FIGURE 4 is a side elevational view of a first modification of the vent member of FIGURE 1 having an adjustable vent closure member therein;

FIGURE 5 is a top plan view of the vent member of FIGURE 4;

FIGURE 6 is a sectional view taken on the line 6—6 of FIGURE 5;

FIGURE 7 is a perspective view of the closure member of FIGURES 4–6;

FIGURE 8 is a side elevational view of a second modification of the vent member of FIGURE 1 having a flexible lower portion and a removable top closure member;

FIGURE 9 is a vertical sectional view of the vent member of FIGURE 8 with the lower flexible portion retracted and the closure member removed; and FIGURE 10 is a top plan view of the vent member of FIGURE 8 with the top closure member removed.

Figure 1:
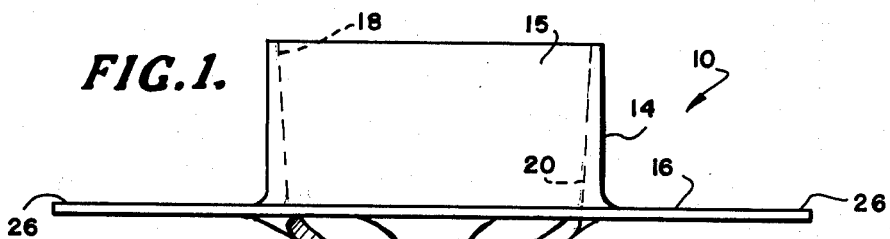
FIGURE 1 is a side elevational view of a vent member embodying the principles of the present invention.
Figure 2:
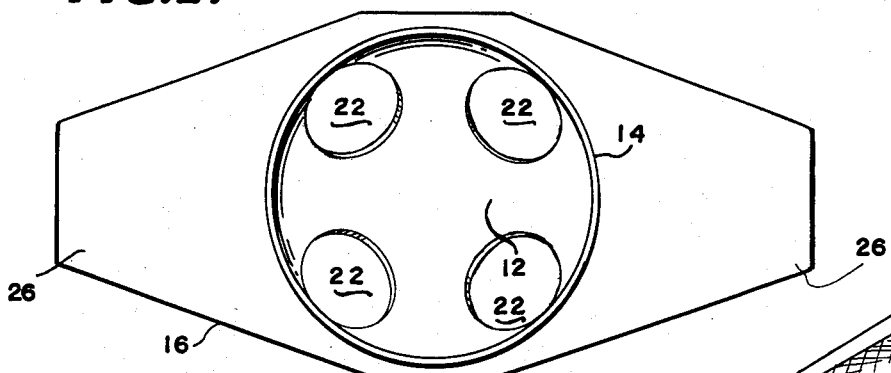
FIGURE 2 is a top plan view of the vent member of FIGURE 1.

Referring to FIGURES 1 and 2, a vent 10 embodying the principles of the present invention includes a downwardly projecting, perforated, lower portion 12, a cylindrical upper portion 14 communicating axially therewith and an outwardly extending polygonal flange portion 16. The vent 10 may be constructed of any material which is non-toxic and structurally strong enough to withstand its intended use in combination with a cast, metal, wood and plastic being suitable. Preferably, a low-cost material and low-cost production techniques will be employed as the article will in most cases be discarded with the cast after the latter is removed from the patient.

According to the present invention, the hollow cylindrical portion 14 is of a size and shape adapted to be coupled to an air hose such as that on a home vacuum cleaner. It is customary for many patients to recuperate in their homes rather than in a hospital, and accordingly a vacuum cleaner would be readily available to them. Conveniently, the inside bore 15 of the upper portion 14 may be slightly tapered toward the lower portion 12 as shown in FIGURE 1 so as to permit easy coupling of the vent to an air hose. The inside diameter at the extremity of the upper portion, illustrated at 18, should preferably be slightly larger than the outside diameter of the air hose to be used and should taper to a diameter, illustrated at 20, less than that of the air hose whereby the hose can be inserted snugly into the bore. Alternatively, the exterior of the upper portion 14 may be tapered toward its extremity so as to allow the air hose to be fitted over the portion 14. In practice, the extremity of the upper portion 14 may have an inside diameter of about 1¼ inches if a standard vacuum cleaner hose is to be inserted therein.

The lower portion 12 may have a variety of shapes and sizes, it being desired only to provide a downwardly projecting surface free from sharp edges and having a plurality of perforations 22 therein. The perforations should be a size small enough to prevent cast material from tending to pass therethrough while not obstructing the passage of air. Preferably, the inlet portion 12 should project downwardly so that the perforations 22 are not pressed flat against the underlying stocking or cotton batting but tend to reside in a pocket or depression formed in the underlying material by the extremity 24 of the portion 12. As shown in FIGURE 1, the exterior shape of the lower portion 12 is that of a portion of a sphere and has four equally spaced perforations 22 therein. Conveniently, each perforation may be a round hole having its axis generally through the center of the spherical portion. Obviously, the number and shape of the perforations 22 may be varied.

The flange portion 16 may be of any desired shape so long as it presents a relatively thin projection for engaging with the cast. Preferably the flange portion will extend at a right angle from the upper portion 14 near the junction of the latter with the lower portion 12 so that the juncture between the lower surface of the flange portion and the inlet portion forms a gradually curving surface for engagement with the undelying cast material. As seen in FIGURE 1, the lower portion 12 gradually tapers downwardly from the flange portion 16. Conveniently, the flange portion extends outwardly in the form of a plurality, two as shown in FIGURE 2, of generally elongated arms 26.

Figure 3:
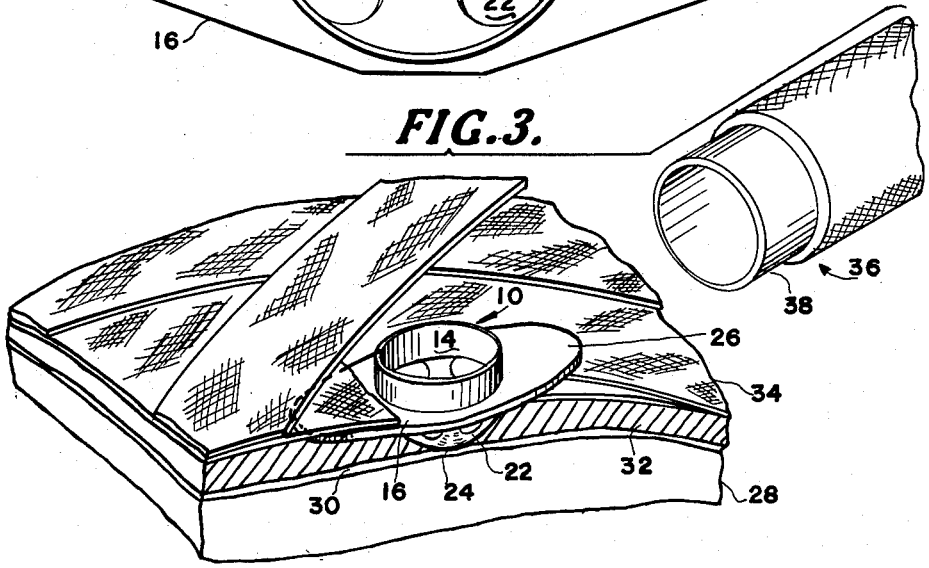
FIGURE 3 is a perspective view showing the manner in which the vent member of FIGURE 1 is incorporated into a cast.

FIGURE 3 shows the manner in which the vent 10 of FIGURES 1 and 2 may be incorporated into a cast. The skin 28 of the injured member is first covered with a layer of porous cotton sheet 30 over which a relatively thick layer of cotton batting 32 is placed. Strips of bandage 34 impregnated with plaster of Paris and water are then wrapped in overlapping relation about the injured member. In the process of applying the cast material, a small area of batting, for example about 1½ inches in diameter, is left uncovered. The vent 10 is then positioned, cylindrical portion 14 facing upwardly, on this uncovered area with the flange 26 extending over the bandages 34 and additional impregnated bandage is wrapped over the top of the flange. As shown, the batting 32 becomes somewhat compressed by tapered portion 24, but it should be understood that, if desired, the batting 32 may be separated with the fingers at this location so that tapered portion 24 rests directly on the cotton sheet 30. When the plaster of Paris hardens, it permanently embeds the flange 26 in the cast material thus eliminating any movement of the vent. A vacuum cleaner hose 36 having a coupling end 38 can be coupled to cylindrical portion 14 of the vent in the manner described above. Air will thus be drawn into the cast at the edges thereof and through any other vents which have been incorporated into the cast. The number and location of the vents will, of course, be governed by the particular circumstances involved.

A modified vent having an adjustable closure member is shown in FIGURES 4–7 wherein primed reference numerals are used to designate parts which are analogous to parts already described. The modified vent 10' includes a downwardly tapered, perforated lower portion 12' a cylindrical upper portion 14' having a bore 15' and an outwardly extending flange portion 16'. Perforations 22' are four equispaced, generally triangular holes in the inlet portion 12'. A rotatable closure member 38 slidably engages the inner surface of the lower portion 12' and, as shown, has a generally cruciform shape and a centrally located, upwardly extending gripping tab 40. The arms 42 of the cruciform are curved upwardly so as to present a convex surface to the concave inner surface of lower portion 12' and have a width sufficient to block perforations 22' when placed thereover. As seen in FIGURE 6, the outer extremities of the arms 42 reside in an inner annular groove 44 in upper portion 14' whereby the closure member 38 is retained in the vent 10'.

In use, the modified vent 10' may be incorporated into a cast in the same manner as the vent 10 of FIGURES 1–3. The effective size of perforations 22' may then be varied by gripping the tab 40 with the fingers and rotating the closure member 38 so as to expose the desired proportion of the perforations 22'. Thus, when a plurality of vents 10' have been incorporated into a cast, ventilation of the skin can be controlled as desired by applying suction to a vent having unobstructed perforations and by adjusting the effective area of the perforations in the other vents.

Another modified vent 10" is shown in FIGURES 8–10 wherein double-primed reference numerals refer to similar parts already described. In this embodiment, a relatively flexible lower portion 12" having a plurality of small round apertures 22" is provided. An upwardly extending pull tab 46 is provided on the upper surface of the lower portion 12", so that the latter may be retracted from the dotted-line position of FIGURE 9 into cylindrical upper portion 14" when desired. A snap-on closure cap 48 having a laterally extending lifting tab 50 is removably fitted to the upper end of cylindrical portion 14. The flange portion 16" consists of four legs 26" extending laterally from the junction of the upper and lower portions. Conveniently, vent 10" can be constructed integrally of plastic, such as polyethylene, and the cap 48 can be constructed of the same material. In use, the vent 10" is incorporated into a cast in the usual manner, and the cap 48 is removed or retained as desired in adjusting the amount and location of the ventilation. The flexible inlet portion 12" may be retracted into outlet portion 14" by means of the pull tab 46 if it is desired to avoid the downward bulge of the inlet portion, as when the skin under the vent is particularly sensitive.

Thus, it will be appreciated that a vent constructed in accordance with the principles of the present invention provides a flexible system for effectively ventilating a cast with a minimum number of vents. While several embodiments have been described, modifications thereof are contemplated, and the disclosed details are not intended to be limiting except as they appear in the appended claims.

What is claimed is:

1. In a surgical cast a vent incorporated therein and extending from the inside to the outside of the cast, said vent comprising: a substantially cylindrical upper portion defining a bore and having a surface adapted to be engaged by an end of a vacuum cleaner hose or the like; a lower portion substantially axial with said upper portion and terminating in a generally convex exterior surface, said lower portion having a plurality of perforations therethrough which communicate with said bore; and flange means extending laterally from said vent at the juncture of said upper portion with said lower portion.

2. The combination of claim 1 wherein a surface of said upper portion is axially tapered so as to engage and grip an end of a vacuum cleaner hose or the like.

3. The combination of claim 1 further comprising: means rotatable within said lower portion for adjustably obstructing said perforations.

4. The combination of claim 3 wherein said rotatable means comprises: a member slidably rotatable on the inner surface of said lower portion and a tab projecting from said member toward said upper portion.

5. The combination of claim 4 wherein the lateral extremities of said rotatable member reside in an inner annular groove in said lower portion.

6. The combination of claim 1 further comprising: a removable closure means associated with the upper end of said bore.

7. The combination of claim 1 wherein said lower portion is flexible so as to be retractable into said bore.

8. The combination of claim 1 wherein the upper end of said bore has a diameter of about 1¼ inches.

9. A method of forming and ventilating a surgical cast comprising: molding the cast upon a body surface and simultaneously incorporating in the cast a plurality of vents each having a passage passing through the wall of the cast; applying suction to the outer end of one of said passages; and adjusting the effective cross section of the other passages by adjustably obstructing the same.

10. The combination of claim 1 wherein said perforations are disposed in said lower portion at locations between the lower extremity of said generally convex exterior surface and said flange means.

References Cited in the file of this patent
UNITED STATES PATENTS 1,956,101    Le Noir _____ Apr. 24, 1934
2,369,303    Kurth et al. _____ Feb. 13, 1945